C. F. G. SABATTIER.
SAFETY DEVICE FOR ELECTRIC MOTOR VEHICLES.
APPLICATION FILED OCT. 5, 1920.

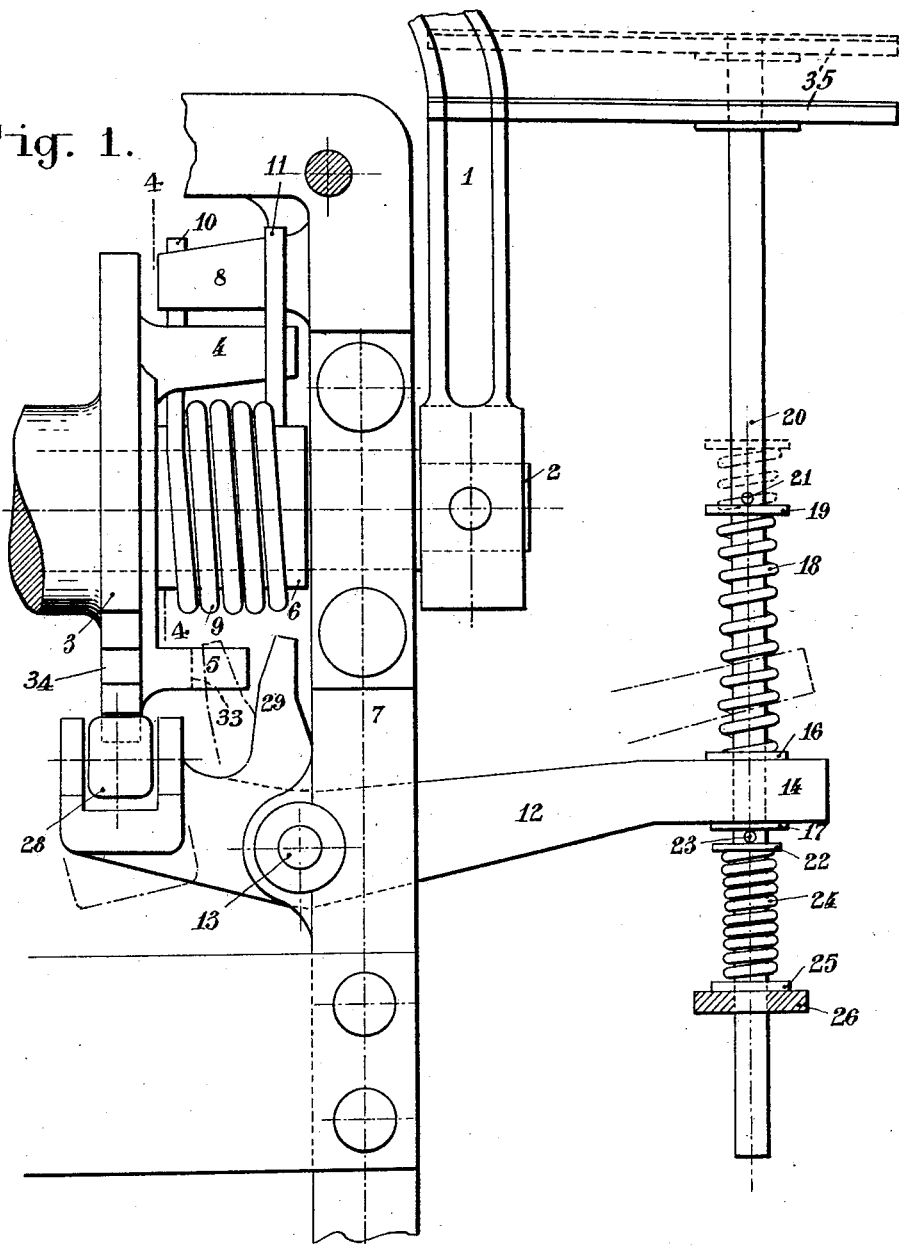

1,409,202.

Patented Mar. 14, 1922.
3 SHEETS—SHEET 2.

Inventor:
Charles Felix
George Sabattier

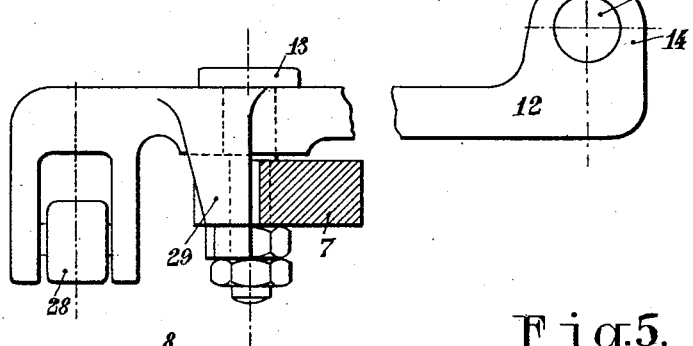
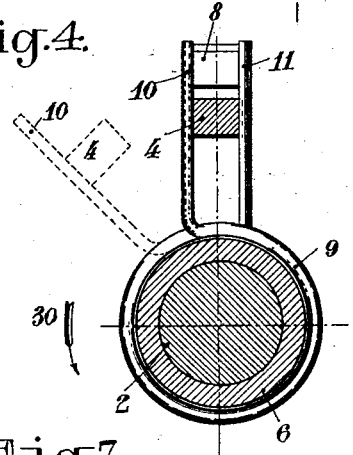
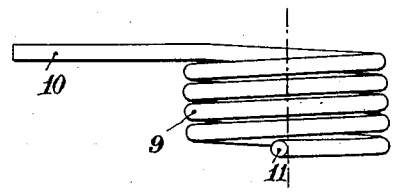
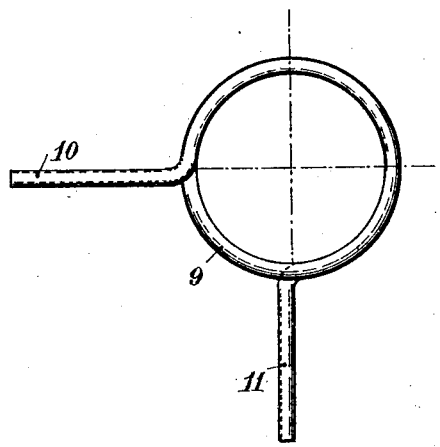
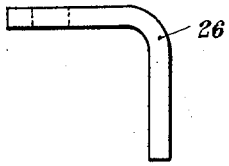

UNITED STATES PATENT OFFICE.

CHARLES FELIX GEORGES SABATTIER, OF PARIS, FRANCE.

SAFETY DEVICE FOR ELECTRIC MOTOR VEHICLES.

1,409,202.     Specification of Letters Patent.    Patented Mar. 14, 1922.

Application filed October 5, 1920. Serial No. 414,904.

*To all whom it may concern:*

Be it known that I, CHARLES FELIX GEORGES SABATTIER, citizen of the Republic of France, residing at Paris, France, have invented certain new and useful Improvements in Safety Devices for Electric Motor Vehicles, of which the following is a specification.

In electric motor vehicles it can happen, that when the driver has left his seat an unauthorized person, for instance a child, moves the control lever of the motor thereby causing the starting of the engine.

Safety means have already been proposed to prevent such an occurrence and to effect, upon the driver leaving his seat, the automatic return of the control lever to neutral position. Moreover, devices, such as brakes, short-circuits, throw-out sliding sleeves have been tried for maintaining the control lever or the shaft of the controller to a certain degree in a neutral position as long as the driver has not taken his seat in the vehicle.

However, all these devices do not permit the return to neutral position, except by means of more or less complicated mechanisms, and besides, they do not insure an absolute locking of the control lever in the neutral position, no matter in which direction an unauthorized person attempts to move the lever, i. e., either toward a higher speed position or to reverse the engine.

My present invention consists in an entirely novel solution of the problem, comprising a device of a particularly simple construction and certain in operation so as to insure an absolute locking of the control lever in its neutral position while the driver is absent, no matter in which position the driver has left the lever and irrespective of the direction in which an unauthorized person attempts to move the lever.

A contrivance according to the present invention is shown by way of example on the accompanying drawing, in which:—

Fig. 1 is a side elevation of the entire safety contrivance showing in broken lines the position of the parts when the lever is locked.

Fig. 3 is a plan of the locking lever the frame being partly in section.

Fig. 4 is a partial section of the contrivance along the line 4—4 of Fig. 1.

Figs. 5 and 6 are plan and end elevation of the returning spring, dismounted.

Fig. 7 is a side elevation of the fixed bracket against which the lower spring actuating the locking lever bears.

Figure 8:
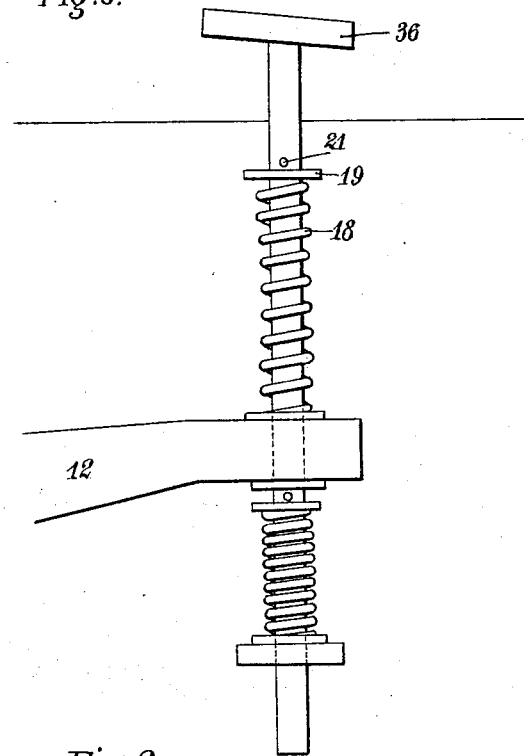
Fig. 8 is an elevation of a portion of my new device where the operating rod is moved by a pedal.
Figure 2:
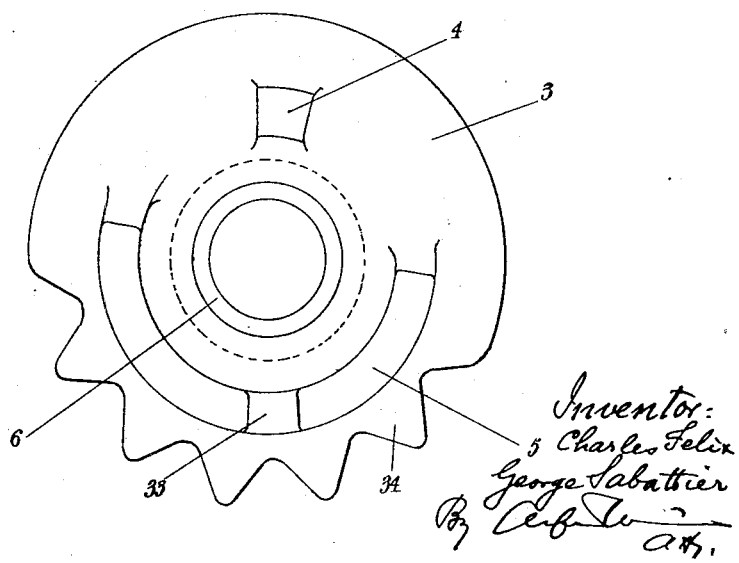
Fig. 2 is a side elevation of the drum on the controller shaft.

The safety contrivance consists of two groups of elements, one being combinations of spring and abutments tending constantly to return the change-speed or control hand lever to the neutral position whatever the direction in which it has been displaced, and the other a locking contrivance proper automatically locking the hand lever in the neutral position when the driver is not in his place on the vehicle.

The first group of elements comprises a change-speed control lever 1 secured to the spindle 2. On this spindle is keyed a disc 3 provided at its upper portion with an abutment 4, and at its lower portion with suitably arranged teeth 34 and a sector 5 containing a notch 33.

The disc 3 has centrally a sleeve 6 coaxial with the spindle 2.

The abutment 4, the notched sector 5 and the sleeve 6 are arranged on the disc 3, between this disc and the change-speed lever 1.

A frame 7 of suitable configuration and of which a portion only is shown in Fig. 1, carries the change-speed spindle 2. This frame is provided with a fixed abutment 8 situated above the abutment 4 of the disc 3 and in proximity thereto.

A returning spring 9 is coiled helically around the sleeve 6 and its two straight ends 10 and 11 are disposed so as to bear in opposite directions against the two abutments 4 and 8; this spring is shown separately in Figs. 5 and 6.

The locking contrivance proper comprises a lever 12 pivoted by means of a pivot 13 on the frame 7 and consisting of a bolt with nut and lock-nut, the lever 12 being held between the head of the bolt and the frame.

The locking lever 12 has a rounded end 14, formed with a circular aperture 15 through which passes an operating rod 20, which is integral with the seat 35 of the driver. Two washers 16 and 17 for the bearing of springs rest against the rounded portion 14 of the lever. The washer 16 takes the pressure of a helical spring 18 the other end of which bears against a washer 19, the upward movement of which is limited by a pin 21 fast in the operating rod 20. The washer 17 bears against another washer 22 by means of an interposed pin 23 fixed in the operating rod. Against the washer 22 presses a helical spring 24 which at its other end bears against a washer 25 resting on a fixed bracket 26, traversed freely by the rod 20, The locking lever 12 has at its other end a rotary roller 28 which engages with the teeth 34 in the periphery of the disc 3.

Finally a latch 29 is provided on the upper portion of the locking lever in proximity to the notched sector 5 of the disc 3, the profile of this latch being such that it can engage in the notch 33 of the sector.

The device operates as follows: As soon as the driver of the vehicle has taken his seat 35, the operating rod 20 is automatically depressed, either by this rod supporting the seat itself (Fig. 1), or by it being surmounted by a pedal 36 (Fig. 8) against which the driver's foot is applied. The locking lever 12 then assumes the position shown in full lines in Fig. 1 in which position the latch 29 is disengaged from the notch 33 of the sector 5. The roller 28 bears against the teeth 34 of the disc 3 holding the same in place, if no sufficient force is exerted on the disc.

The driver then rocks the change-speed lever 1 in the direction of the arrow 30 of Fig. 4, the lever carrying with it the spindle 2; the disc 3 rotates in the same direction; in effect the end 14 of the lever 12 being connected to the operating rod 20 by an elastic connection can slightly rock about its pivot 13 which permits the disengagement of the roller 28 from the teeth 34 and thereby the rotation of the disc 3.

The abutment 4 participating in the rotation of the disc 3, moves with it the left end 10 of the spring 9, the other end 11 bearing against the fixed abutment 8 of the frame. The returning spring 9 is thus strained and its pressure tends to cause the abutment 4 to approach the abutment 8 and consequently to bring back the control lever 1 to the neutral position.

When the control lever is in front of the desired speed position, the 3rd forward speed for example, the roller 28 is engaged between two adjacent teeth 34; if then the control lever is released, at the 3rd speed position, the entire contrivance is held in place.

The spindle 2, which has turned at the same time as the lever 1, has actuated the usual electric connections, which have placed the electric motor in the condition corresponding to the 3rd speed of the vehicle.

For reverse driving, it is sufficient to operate the control lever 1 in the reverse direction to the arrow 30. In such case, the same sequence of transmission of movement occurs in the reverse direction to that above; in particular, the end 10 of the spring 9 remains stationary bearing against the fixed abutment 8, whilst the end 11 is moved from the abutment 8 by the movable abutment 4.

Now, when for any reason the driver of the vehicle leaves his place, the operating rod 20, ceasing to be forced downwards moves vertically upwards; the compressed spring 24 extends and bearing against the washer 25 and the bracket 26, pushes upwards the washers 22 and 17 and the end 14 of the locking lever, which rocks about the pivot 13 and assumes the position indicated in dotted lines in Fig. 1. The roller 28, which is subjected to the same oscillation about the pivot 13, disengages from all contact with the disc 3. The disc 3 and consequently the abutment 4 become freed, the strained spring 9 immediately actuates the abutment 4 and brings it back to exactly beneath the fixed abutment 8. The spindle 2, and the control lever 1, rotate in the same direction and the control lever resumes the position wherein the movable abutment 4 is exactly beneath the fixed abutment 8, i. e., the neutral or dead position.

At the same time the notched sector 5 has participated in the rotary movement of the disc 3; under the influence of the upward thrust of the spring 24, the latch 29 is applied to the lateral surface of the sector 5, during the rotation of this sector until the instant when, the control lever being returned to the neutral position, the latch 29 finds itself opposite the notch of the sector 5 and enters therein; the contrivance is thus locked automatically, the control lever being at the neutral position.

Thus, as soon as the driver leaves his place for any reason, the control lever returns automatically to the nuetral position and is locked therein.

The safety contrivance described above and which forms the subject of my invention has been shown, by way of example, to be applied to an electrically driven motor vehicle, but can under similar conditions be applied to all kinds of motor vehicles, whatever the nature of the driving power (electricity, internal combustion engine, etc.)

I claim as my invention—

1. In a device for automatically locking the control lever of a motor vehicle in its neutral position, the combination with the said lever, a spindle carrying the same and a frame portion, of a coiled spring constantly tending to return the said lever to its neutral position, a fixed abutment for the one end of the said spring, a disc secured to the said spindle and formed with teeth, an abutment on the said disc for the other end of the said spring and adapted to co-operate with the said fixed abutment, a notched sector provided on the said disc, a sleeve coaxial with the said spindle and carrying the said coiled spring, the two ends of the said spring bearing against opposite sides of the said two abutments, a double lever pivoted to the said frame, the one arm of the said lever having an aperture and a spring bearing against said lever arm, an operating rod passing through the aperture in the said lever arm, the other lever arm carrying a roller adapted to engage with the teeth in the said disc, and a latch adapted to engage the notch in the said sector in its position corresponding to the neutral position of the said control lever, the said operating rod being normally held in depressed position by the driver to counteract the force of the said coiled spring, but releasing the said spring when being in an elevated position.

2. A combination as specified in claim 1, in which the said operating rod carries the seat of the driver, the weight of the latter holding the said operating rod in depressed position thereby preventing the said coiled spring from moving the said control lever to neutral position.

In testimony whereof, I have affixed my signature in the presence of two witnesses.

CHARLES FELIX GEORGES SABATTIER.

Witnesses:
LOUIS GARDET,
CLEMENT S. EDWARDS.